No. 896,319.  
PATENTED AUG. 25, 1908.

H. D. GARDY.  
PUZZLE.  
APPLICATION FILED APR. 11, 1908.

WITNESSES:  
INVENTOR.  
Henry D. Gardy  
BY  
William D. Jackson  
ATTORNEY.

UNITED STATES PATENT OFFICE.

HENRY D. GARDY, OF PHILADELPHIA, PENNSYLVANIA.

PUZZLE.

No. 896,819.

Specification of Letters Patent.

Patented Aug. 25, 1908.

Application filed April 11, 1908. Serial No. 426,425.

*To all whom it may concern:*

Be it known that I, HENRY D. GARDY, a citizen of the United States, residing at Philadelphia, in the county of Philadelphia and State of Pennsylvania, have invented a certain new and useful Puzzle, of which the following is a specification.

The invention relates to a new, amusing and instructive toy or puzzle and has for its object the providing of a puzzle which may afford amusement as well as being instructive and which will further afford training for both the eye and the hand.

Figure 1:
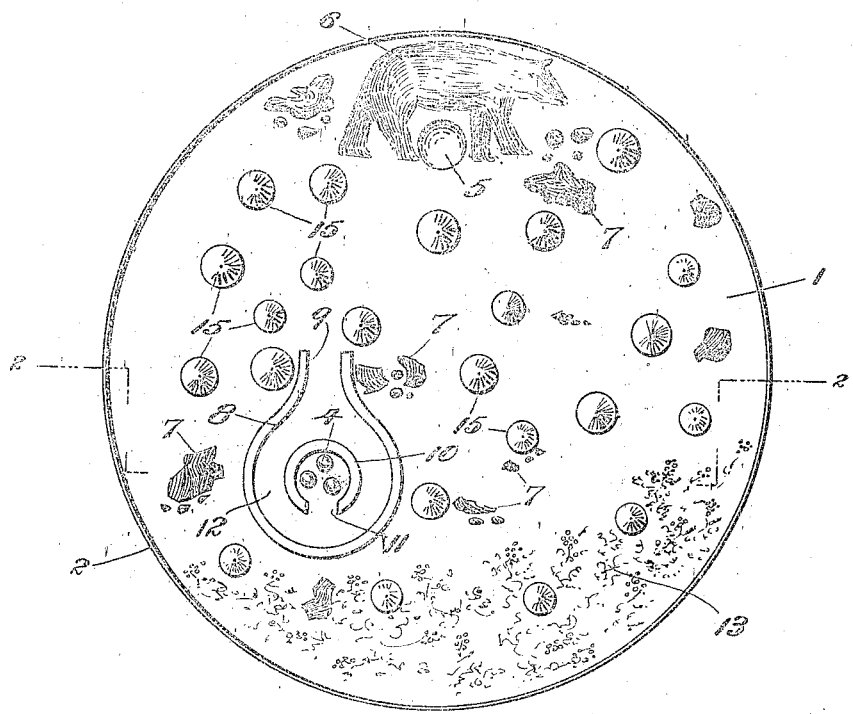
Figure 2:
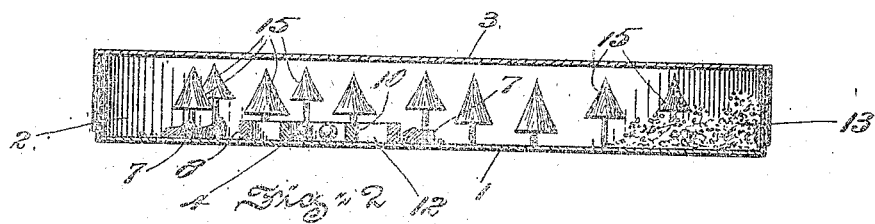

A description will now be given of the construction of the puzzle and the mode of using the same, reference being had to the accompanying drawings forming part of this specification, in which Figure 1, is a top or plan view, with the lid or cover removed, of the puzzle of the invention, and, Fig. 2, is a sectional view taken upon the line 2—2, of Fig. 1, with the lid or cover applied.

In carrying out the invention, use is made of a box like structure of card-board or other suitable material of which 1, designates the base which serves as the playing field, 2, the sides and 3, the lid or cover. When the cover is removed the base and sides serve as a tray and in this respect it may be remarked that the tray is of sufficient depth to preclude the possibility of the playing pieces or spherical bodies 4, preferably shot which are used therein from falling thereout.
Within this tray and upon the playing field there is arranged a depression or cavity 5, in juxtaposition to which is a representation of an animal 6, which may be either a picture or other suitable symbol. Secured to the base of the tray and arranged vertically to the plane of its surface are a multiplicity of imitation trees 15 scattered in an irregular manner throughout the field of the puzzle, their purpose being to buffet and impede the progress of the spherical bodies 4, when the tray is tilted as hereinafter described. Interspersed throughout the field of the puzzle are other obstructions representing rocks 7. An open generally circular inclosure or pen 8, having an opening or flaring mouth 9, is shown as being located upon the field and arranged some distance removed from and to one side of the representation of animal above referred to. Another open circular inclosure or pen 10, of smaller diameter is formed inside the pen 8, and has an opening or mouth 11, disposed diametrically opposite the mouth 9, of the pen 8. The space between the pens forms a raceway 12, for the playing pieces. Beyond the trap or pen and near to the outer edge of the tray is arranged imitation shrubbery and berries 13, which may be either a picture or other suitable symbol. It will be observed that the trap or pen is, generally speaking, located between the shrubbery 13, and the animal 6.

From this description the method of solving the puzzle will be obviously as follows:—
The puzzle represents a forest in which lives a mother bear and her cubs or young bears. The cubs have strayed away in search of berries and a hunter has set a trap to catch them and the object of the game therefore is to trap the cubs before they get back to their mother, the person endeavoring to solve the puzzle being the hunter. To trap the cubs necessitates getting all of them within the inner inclosure or trap 10, and this may be done by certain manipulations of the tray. However, this will require much patience and effort on the part of the player as the trees and rocks will buffet the playing pieces around before the desired result is obtained. In this respect the depression or cavity 5, adds to the difficulty of solving the puzzle in that should any of the cubs find their way within the depression the person manipulating the tray forfeits his turn.

What I claim is:

1. A puzzle comprising a tray forming an inclosure or playing field, a multiplicity of imitation trees arranged throughout said field, a trap consisting of concentric pens having openings arranged upon said field in the midst of said trees, a series of spherical playing pieces and the representation of an animal and shrubbery disposed upon opposite sides of the trap, the field having also a cavity near the representation of the animal.

2. A puzzle comprising a tray forming an inclosure or playing field, a depression or cavity near to the outer edge of the field, the representation of a bear in juxtaposition thereto, imitation shrubbery and berries arranged near the edge of the field opposite the bear, a multiplicity of imitation trees arranged between the bear and the shrubbery, a trap located in the midst of said trees and a series of spherical playing pieces.

In testimony whereof I have affixed my signature.

HENRY D. GARDY.

Witnesses:
M. E. EASTLACK,
W. J. JACKSON.